United States Patent
Peduto

(10) Patent No.: US 7,025,843 B2
(45) Date of Patent: Apr. 11, 2006

(54) ARTICLES COMPRISING A POLYOLEFIN-BASED ELEMENT JOINED TO A POLYAMIDE-BASED ELEMENT, AND PROCESS FOR OBTAINING THEM

(75) Inventor: Nicolangelo Peduto, Cesano Maderno (IT)

(73) Assignee: Rhodia Engineering Plastics, S.A., St. Fons (FR)

( * ) Notice: Subject to any disclaimer, the term of this patent is extended or adjusted under 35 U.S.C. 154(b) by 107 days.

(21) Appl. No.: 10/221,770

(22) PCT Filed: Mar. 15, 2001

(86) PCT No.: PCT/FR01/00779

§ 371 (c)(1),
(2), (4) Date: Jun. 6, 2003

(87) PCT Pub. No.: WO01/68365

PCT Pub. Date: Sep. 20, 2001

(65) Prior Publication Data

US 2003/0190488 A1 Oct. 9, 2003

(30) Foreign Application Priority Data

Mar. 17, 2000 (FR) .................................. 00 03445

(51) Int. Cl.
*B29C 65/02* (2006.01)
(52) U.S. Cl. ............... 156/73.5; 156/73.1; 428/476.1; 428/476.9; 428/36.9; 428/36.91
(58) Field of Classification Search ............ 428/476.1, 428/476.9, 36.9, 36.91; 156/73.5
See application file for complete search history.

(56) References Cited

U.S. PATENT DOCUMENTS

| | | | |
|---|---|---|---|
| 4,770,837 A * | 9/1988 | Lu et al. ...................... | 264/503 |
| 6,432,548 B1 * | 8/2002 | Alex et al. ................ | 428/475.8 |
| 2002/0055006 A1 * | 5/2002 | Vogel et al. ................ | 428/520 |

* cited by examiner

*Primary Examiner*—Melanie Bissett
(74) *Attorney, Agent, or Firm*—Buchanan Ingersoll, P.C.

(57) ABSTRACT

The invention concerns manufactured articles comprising at least two assembled thermoplastic elements, a first element based on polyolefin and a second element based on polyamide. The elements are assembled by being welded together.

19 Claims, No Drawings

ARTICLES COMPRISING A POLYOLEFIN-BASED ELEMENT JOINED TO A POLYAMIDE-BASED ELEMENT, AND PROCESS FOR OBTAINING THEM

The present invention relates to manufactured articles comprising at least two elements made of thermoplastics which are joined together, namely a first element based on a polyolefin and a second element based on a polyamide. These articles are particularly useful in the automobile and sports equipment sectors.

The choice of a thermoplastic for producing manufactured articles formed from the latter is generally guided by criteria based on costs and properties. Thus, depending on the use to which an article will be put and the environment in which it will be used, different properties will be required, such as toughness, stiffness, flexibility, dimensional stability, deflection temperature under load, thermal withstand, impermeability to certain chemicals, resistance to contact with certain substances, etc.

Among the materials used, thermoplastic polyolefins generally have a low cost. As examples, mention may be made of polyethylene and polypropylene.

Polyamides have a higher level of performance. For example, they exhibit better mechanical behavior at high temperatures.

To find the best cost/properties comprise, it is known to produce articles by assembling elements formed from different materials. Such assemblies make it possible to use the most suitable material for each functional part of the article.

The operation of assembling the various elements must also be taken into account in the design of an article: it may incur additional costs and have an impact on the characteristics of the article (degradation of the mechanical properties, creation of an area of weakness, poor sealing, etc.). The mode of assembly may therefore be an essential characteristic for the production of manufactured articles.

To produce assemblies of polyolefin and polyamide elements, it is known to use mechanical means. For example, it is known to assemble respectively polyamide and polyethylene tubular parts by means of a sleeve into which the elements are screwed or fitted. The mechanical assembly operation may result in sealing defects and may in certain cases prove to be ill-suited.

It is also known to adhesively bond the elements. This mode of assembly requires the application of a layer of adhesive, sometimes in areas that are difficult to reach. This may in certain cases be a drawback and entail an additional cost.

Polyamides and polyolefins are chemically incompatible materials, that is to say they cannot be blended together. This incompatibility prevents them from being welded to each other.

The subject of the present invention is articles comprising respectively polyamide-based and polyolefin-based elements, exhibiting another structure, especially another assembly. The articles according to the invention exhibit excellent mechanical properties and provide excellent sealing at the point of assembly.

For this purpose, the invention proposes an article comprising at least two elements made of thermoplastics which are joined together, a first element being formed from a material based on a polyolefin and a second element being formed from a material comprising a polyamide, characterized in that the material of the second element is a composition comprising at least one polyamide and a compatibilizer for polyamides and polyolefins, and in that the assembly operation is carried out by welding the two elements together over at least a portion of the surfaces of the latter.

The expression "assembly of elements" is understood to mean any structure in which at least two elements are brought into contact with each other over at least a portion of their respective surfaces and are consolidated at the contact surface. According to the invention, consolidation is obtained by welding.

The two elements may be brought into contact with each other over plane portions of their surfaces, or over curved portions. Preferably, the surfaces brought into contact with each other cooperate to form a continuous weld line or a continuous weld area.

According to one particular embodiment of the invention, those portions of the elements brought into contact with each other are of conjugate shapes. For example, they may be socketed. As an example, a tubular portion of one element may be inserted into a tubular portion of the other element, having a slightly larger diameter.

The polyolefin used for producing the first element is preferably chosen from polyethylenes, polypropylenes and copolymers based on ethylene and $\alpha$-olefins. As examples, mention may be made of polyethylenes, polyethylene, low-density polyethylenes and high-density polyethylenes.

The compatibilizer used for implementing the invention is preferably chosen from the family of ionomers. Ionomers are ionic copolymers having repeat units of at least one $\alpha$-olefin and at least one unsaturated $\alpha$, $\beta$-carboxylic acid, at least some of the acid units of which are ionized with a metal ion. The $\alpha$-olefin preferably contains 2 to 6 carbon atoms and the acid preferably contains 3 to 6 carbon atoms. The $\alpha$-olefin is preferably ethylene and the acid is preferably acrylic or methacrylic acid. Other monomers may be used in a complementary manner, such as acrylates or methacrylates. The metal ion may be monovalent, divalent or trivalent, such as for example sodium, zinc, aluminum and potassium ions. As an example of an ionomer that can be used, mention may be made of the (80/10/10) ethylene/isobutyl acrylate/methacrylic acid copolymer 70% neutralized with zinc.

Ionomers that can be used for implementing the invention are those sold under the name SURLYN® by DuPont de Nemours.

The composition from which the second element is formed preferably contains, in addition to the polyamide and the compatibilizer, a polyolefinic compound. The term "polyolefinic compound" is understood to mean a compound of polymeric type which comprises olefinic repeat units. This may, for example, be a thermoplastic or an elastomer.

According to a first embodiment of the invention, the polyolefinic compound is a thermoplastic, preferably of the same kind as that from which, or on the basis of which, the first element is formed. The polyolefin is preferably chosen from polyethylenes and polypropylenes. In addition, it may be functionalized, for example by maleic anhydride. It may also be advantageous to use a blend of a functionalized polyethylene and a nonfunctionalized polyethylene.

According to another embodiment of the invention, the polyolefinic compound is elastomeric in character. As examples, mention may be made of ethylene-propylene rubbers (EPR) and ethylene-propylene-diene monomer rubbers (EPDM). Optionally, these compounds may be functionalized by maleic anhydride.

The polyamide included in the composition forming the material of the second element is preferably chosen from semicrystalline polyamides, for example polymers obtained by a polycondensation reaction of saturated aliphatic dicarboxylic acids having from 6 to 12 carbon atoms, such as for example adipic acid, azelaic acid, sebacic acid, dodecanoic acid or a mixture thereof, with diprimary diamines, preferably linear or branched saturated aliphatics having from 4 to 12 carbon atoms, such as, for example, hexamethylenediamine, trimethylhexamethylenediamine, tetramethylenediamine, m-xylenediamine or a mixture thereof; polyamides obtained either by direct homopolycondensation of an ω-aminoalkanoic acid comprising a hydrocarbon chain having from 4 to 12 carbon atoms, or by hydrolytic opening and polymerization of lactams derived from these acids; copyamides obtained from the starting monomers for the aforementioned polyamides, it being possible for the acid component of these copolyamides to furthermore consist partly of terephthalic acid and/or isophthalic acid; and blends of these polyamides or their copolymers.

By way of illustration of the polyamides obtained by the polycondensation of diacides and diamines, mention may be made, for example, of:

nylon-4,6 (a polymer obtained from tetramethylenediamine and adipic acid);

nylon-6,6 (a polymer obtained from hexamethylenediamine and adipic acid);

nylon-6,9 (a polymer obtained from hexamethylenediamine and azelaic acid);

nylon-6,10 (a polymer obtained from hexamethylenediamine and sebacic acid);

nylon-6,12 (a polymer obtained from hexamethylenediamine and dodecanedioic acid).

As an illustration of the polyamides obtained by homopolycondensation that may be suitable, mention may be made of:

nylon-4 (a polymer obtained from 4-aminobutanoic acid or from γ-butyrolactam);

nylon-5 (a polymer obtained from 5-aminopentanoic acid or from δ-amylolactam);

nylon-6 (a polymer obtained from ε-caprolactam);

nylon-7 (a polymer obtained from 7-aminoheptanoic acid);

nylon-8 (a polymer obtained from capryllactam);

nylon-9 (a polymer obtained from 9-aminononanoic acid);

nylon-10 (a polymer obtained from 10-aminodecanoic acid);

nylon-11 (a polymer obtained from 11-aminoundecanoic acid);

nylon-12 (a polymer obtained from 12-aminododecanoic acid or from laurylactam).

By way of illustration of copolyamides, mention will be made, for example, of:

nylon-6,6/6,10 (a copolymer obtained from hexamethylenediamine, adipic acid and sebacic acid);

nylon-6,6/6 (a copolymer obtained from hexamethylenediamine, adipic acid and caprolactam);

nylon-6/12;

nylon-6/11;

nylon-6/6,36.

The preferred polyamides of the invention are nylon-6,6 polyamides, nylon-6 polyamides and nylon-6,6/6 and nylon-6/6,36 copolyamides.

The thermoplastics from which the elements are formed may advantageously include fillers, for example reinforcing fillers, such as glass fibers, fibers made of thermosetting synthetic materials or materials having a melting point above 325° C., carbon fibers, and/or mineral powders such as talc, mica, kaolin and calcium carbonate. These fillers are widely used in the fields of plastics technology.

They may also include additives usually added to thermoplastic compositions, such as stabilizers, plasticizers, fire retardants, antioxidants, lubricants or other conventional additives.

Any known process may be used to produce elements formed from a thermoplastic comprising several components. For example, mention may be made of:

forming from granules of a composition containing all the elements;

forming from blends of granules of different compositions and optionally of additives introduced in powder or masterbatch form, for example granules of polyethylene, polyamide and ionomer;

forming from granules, some of which are coated with an additive or another compound.

The compositions comprising a polyamide, a compatibilizer and a polyolefinic compound generally have a continuous phase and a dispersed phase within the continuous phase. The nature of the components and their concentration are advantageously chosen so that the continuous phase consists of a polyamide and the dispersed phase consists of the polyolefinic compound. This morphology may allow the material to have the characteristic properties of the polyamide. It may allow, for example, the permeability to fuels to be maintained at a sufficiently low level. The composition of which the second element is made preferably exhibits good impermeability to fuels containing alcohols.

The two elements may be formed using conventional processes, among which mention may be made of injection molding, extrusion blow molding, gas injection molding and water injection molding. The elements may possibly have a cavity or a hollow portion.

According to one particular embodiment, the two elements are hollow or have a hollow cross section and are assembled so that the hollow portions of each of the elements communicate with each other. The assembly is advantageously produced by shape complementarity.

The second element may, for example, be a tubular conduit.

To produce a second element of tubular shape, the technique of extrusion blow molding may be preferred. For this purpose, the polyamide-based composition preferably has a melt flow index of between 0.5 g/10 min and 8 g/10 min, determined by applying a load of 5 kg at 275° C. In addition, it may advantageously have a modulus of less than 1500 MPa, preferably less than 1000 MPa, which gives the element a sufficient degree of flexibility, which may make it easier to mount the articles and avoid forming them with a complex profile. The second element may also have bellows portions allowing its flexibility to be further improved. According to another beneficial feature, the composition may have a notched Izod impact strength, measured at 23° C., of greater than 800 J/m.

The final consolidation of the parts after assembly is carried out by welding. After the surfaces have been brought into contact with each other, they are, for example, raised to a temperature at least above the softening point of the materials constituting the elements, preferably close to the melting point.

As known welding techniques suitable for the invention, mention may be made, for example, of:

| | |
|---|---|
| ultrasonic welding: | the surfaces are heated to the desired temperature by ultrasound; |
| vibration welding: | the surfaces are brought into contact and vibrating one with respect to the other, the friction between the surfaces causing the material to heat up and soften; |
| hot-plate welding: | a heated plate is placed between the welding surfaces and then removed when these have reached the desired temperature. The surfaces are then brought into contact with each other under a defined pressure; |
| infrared welding: | a technique similar to that of hot-plate welding, the heat source emitting infrared radiation; |
| laser welding. | |

Further details and advantages of the invention will become more clearly apparent in the light of the examples given below solely by way of indication.

EXAMPLES

The following compositions were produced:

Composition 1

Composition obtained by extruding a blend consisting of 20% by weight of granules of an ionomer sold by DuPont under the name SURLYN® 1652 and 80% by weight of the following elastomerized polyamide composition:

57.4% by weight of a nylon-6 polyamide sold by Rhodia Engineering Plastics under the reference TECHNYL C 502, having a relative viscosity of 5;

40% by weight of a maleic anhydride-grafted ethylene-propylene elastomer sold by Exxon under the name EXXELOR VA 1801;

2.6% of pigments and lubricants (carbon black and calcium stearate).

Composition 2:

Composition obtained by extruding:

57.4% by weight of a nylon-6 polyamide sold by Rhodia Engineering Plastics under the reference TECHNYL C 502, having a relative viscosity of 5;

30% of a high-density polyethylene (HDPE) sold by BASF under the name LUPONEN ELENAC;

10% of an ionomer sold by DuPont under the name SURLYN® 1652;

2.6% of pigments and lubricants (carbon black and calcium stearate).

Plaques were formed by injection molding, using composition 1. composition 2, the elastomerized polyamide described above, and the high-density polyethylene described above.

The plaques were welded together in pairs, holding them for about 10 seconds at 320° C. using the hot-plate welding technique. The force in newtons needed to separate the two plaques was measured. It is given in Table I.

TABLE I

| | Elastomerized PA-6 (comparative example) | HDPE (element 1) |
|---|---|---|
| Composition 1 (element 2) | 650 | 780 |
| Composition 2 (element 2) | 940 | 840 |
| Elastomerized PA-6 (element 2, comparative example) | 1000 | 0 |

Compositions 1 and 2 have a greater ability to be welded to polyethylene than that of a polyamide not according to the invention.

The permeability to fuels of compositions 1 and 2, of the elastomerized polyamide and of the high-density polyethylene were measured.

The permeability of the tubes manufactured was evaluated using a static method. A tube specimen 300 mm in length was closed at one of its ends with a nylon plug covered with a fuel-resistant adhesive. The tube was connected at its other end to a fuel tank with a capacity of 25 cm$^3$, in order thereby to keep the composition of the fuel in the tube constant. The tube was conditioned in terms of temperature and of fluid impregnation in order thus to obtain a direct measurement of the permeability. The tests were carried out at 40° C. and the diffusion was determined by the weight loss over a defined period, for example after periods of 24 hours.

Thus, the permeability corresponds to the rate of weight loss of the specimen determined when the weight loss for successive periods is constant.

The measurements (in g/m$^2$.day) are given in Table II for various fuels.

TABLE II

| | Fuel without alcohol | Diesel fuel containing 22% alcohol | Fuel containing 6.5% alcohol |
|---|---|---|---|
| Elastomerized PA-6 | 0 | 11 | 26 |
| HDPE | 40 | 38 | 54 |
| Composition 1 | 0 | 0 | 0 |
| Composition 2 | 0 | 0 | 11 |

These results show that the compositions exhibit excellent impermeability to the fuels.

What is claimed is:

1. A process for manufacturing articles by forming elements made of a thermoplastic and then joining them together, wherein the joining operation is carried out by bringing the elements into contact with each other over at least a portion of their surfaces and then welding the two elements over at least a portion where the two elements are in contact, at a temperature above the softening point of the materials constituting the elements, a first element being formed from a material based on a polyolefin and a second element being formed from a material comprising a polyamide, wherein the material of the second element is a composition comprising at least one polyamide and a compatibilizer for polyamides and polyolefins.

2. The process as claimed in claim 1, wherein the welding is carried out by means of a laser.

3. The process as claimed in claim 1, wherein the welding is carried out by a vibration welding technique.

4. The process as claimed in claim 1, wherein the welding is carried out by an ultrasonic welding technique.

5. The process as claimed in claim 1, wherein the welding is carried out by a hot-plate welding technique.

6. The process as claimed in claim 1, wherein the welding is carried out by an infrared welding technique.

7. The process as claimed in claim 1, wherein the compatibilizer is an ionomer.

8. The process as claimed in claim 1, wherein the material of the second element is a composition comprising a polyamide, an ionomer and a polyolefinic compound.

9. The process as claimed in claim 8, wherein the polyolefinic compound is an elastomer or a thermoplastic.

10. The process as claimed in claim 8, wherein the polyolefinic compound is a thermoplastic of the same kind as that from which the first element is produced.

11. The process as claimed in claim 1, wherein the polyamide is selected from the group consisting of nylon-6, nylon-11, nylon-12, nylon-4,6, nylon-6,10, nylon-6,6, nylon-6,10, nylon-6,36, copolymers and blends based on these polymers.

12. The process as claimed in claim 1, wherein the composition has a melt flow index of between 0.5 g/10 min and 8 g/10 min, measured under a load of 5 kg at a temperature of 275° C.

13. The process as claimed in claim 1, wherein the polyolefin is selected from the group consisting of polyethylenes, polypropylenes, copolymers and blends based on these polymers.

14. The process as claimed in claim 8, wherein the polyolefinic compound is polyethylene.

15. The process as claimed in claim 8, wherein the polyolefinic compound is an ethylene-propylene rubber functionalized by maleic anhydride.

16. The process as claimed in claim 8, wherein the composition has a continuous phase and a dispersed phase within the continuous phase, the continuous phase comprising the polyamide and the dispersed phase comprising the polyolefinic compound.

17. The process as claimed in claim 1, wherein the elements are obtained by using a technique selected from the group consisting of injection molding, extrusion blow molding, gas injection molding and water injection molding.

18. The process as claimed in claim 1, wherein the two elements are hollow, assembled by the complementarity of the shapes so that the hollow portions of each of the elements communicate with each other.

19. The process as claimed in claim 18, wherein the second element is a tubular conduit.

* * * * *